(12) United States Patent
Gammel et al.

(10) Patent No.: US 10,754,617 B2
(45) Date of Patent: Aug. 25, 2020

(54) GENERATING OF RANDOM NUMBERS

(71) Applicant: Infineon Technologies AG, Neubiberg (DE)

(72) Inventors: Berndt Gammel, Markt-Schwaben (DE); Rainer Goettfert, Putzbrunn (DE)

(73) Assignee: Infineon Technologies AG, Neubiberg (DE)

( * ) Notice: Subject to any disclaimer, the term of this patent is extended or adjusted under 35 U.S.C. 154(b) by 67 days.

(21) Appl. No.: 14/994,367

(22) Filed: Jan. 13, 2016

(65) Prior Publication Data
US 2016/0210121 A1 Jul. 21, 2016

(30) Foreign Application Priority Data
Jan. 20, 2015 (DE) .......... 10 2015 100 760

(51) Int. Cl.
*G06F 7/58* (2006.01)

(52) U.S. Cl.
CPC .............. *G06F 7/582* (2013.01); *G06F 7/584* (2013.01)

(58) Field of Classification Search
CPC ................... G06F 7/582; G06F 7/584
See application file for complete search history.

(56) References Cited

U.S. PATENT DOCUMENTS

| | | | | |
|---|---|---|---|---|
| 6,834,291 B1* | 12/2004 | Pugh | ....... | G06F 7/584 708/252 |
| 2004/0049525 A1* | 3/2004 | Hars | ....... | G06F 7/584 708/250 |
| 2004/0078401 A1* | 4/2004 | Hilton | ....... | G06F 7/48 708/252 |
| 2004/0090907 A1* | 5/2004 | An | ....... | G06F 7/584 370/208 |
| 2006/0039558 A1* | 2/2006 | Morii | ....... | G06F 7/582 380/46 |
| 2014/0019502 A1* | 1/2014 | Goettfert | ....... | H04L 9/0662 708/252 |
| 2014/0067891 A1* | 3/2014 | Goettfert | ....... | G06F 7/584 708/252 |
| 2015/0095274 A1* | 4/2015 | Lamb | ....... | G06N 3/049 706/25 |

FOREIGN PATENT DOCUMENTS

DE 10357782 B3 5/2005

OTHER PUBLICATIONS

German Patent Office, Office Action issued for DE 102015100760.6, 6 pgs., dated May 19, 2015.
Gammel, et al., "An NLFSR-Based Stream Cipher", IEEE, pp. 2917-2920, 2006.

* cited by examiner

*Primary Examiner* — Chuong D Ngo
(74) *Attorney, Agent, or Firm* — Schiff Hardin LLP

(57) ABSTRACT

A device for generating a random number is suggested, the device comprising at least two shift registers, a transformation function that generates the random number based on at least one cell of each of the at least two shift registers.

16 Claims, 3 Drawing Sheets

GENERATING OF RANDOM NUMBERS

BACKGROUND OF THE INVENTION

Embodiments of the present invention relate to an approach that allows generating at least one random number in an efficient manner.

SUMMARY

A first embodiment relates to a device for generating a random number, the device comprising:
- at least two shift registers,
- a transformation function that generates the random number based on at least one cell of each of the at least two shift registers.

A second embodiment relates to a method for generating a random number, the method comprising:
- generating the random number based on at least one cell of each of at least two shift registers by a transformation function.

A third embodiment relates to a device for generating a random number comprising:
- means for generating the random number based on at least one cell of each of at least two shift registers by a transformation function.

A forth embodiment is directed to a computer program product directly loadable into a memory of a digital processing device, comprising software code portions for performing the steps of the method described herein.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Random numbers are required by various applications. For example, a microcontroller, a processor or any processing device may have a need for such random numbers. One application may be masking and/or randomizing data in a security scenario.

It is noted that "random" may refer to a "true" random event or to a "pseudo"-random event. For example, a random generator may produce true random numbers or pseudo-random numbers. Depending on a use-case scenario, random numbers may be true random numbers or pseudo-random numbers. In this specification, the term random number may refer to either a true random or a pseudo-random number.

According to an example, a smartcard may require four random bytes (or pseudo-random bytes, see above) with each clock cycle. The smartcard may utilize these random bytes for various applications. Examples presented herein refer to a generator (random number generator, randomizer) that allows producing random bytes in an efficient way, in particular with a reduced amount of hardware which leads to a reduced area on a chip.

In order to produce four random bytes (i.e. 32 random bits) per clock cycle, 32 parallel shift registers would be required, which results in a considerable amount of chip area. Examples presented in particular show how such large chip area can be reduced also leading to a cost-efficient implementation of the generator.

Examples presented herein in particular provide an efficient generator that produces a predefined number of random bits (or random bytes) per clock cycle. The generator may be, e.g., a pseudo-random number generator (PRNG).

The random bits may be statistically independent from each other, i.e. a single random bit does not imply or provide any information about any other random bit.

It is noted that any random unit other than random bit may be used. Each random unit may comprise k bits, wherein $k \geq 2$. In case the random unit is a byte, $k=8$.

The generator may comprise a number of r feedback shift registers, in particular a number of r non-linear feedback shift registers (NLFSRs). Each NLFSR concurrently supplies several adjacent cells (e.g., bits). In other words, each NLFSR per shift register clock pulse produces an output vector instead of a mere output bit.

An output vector u of a NLFSR is subject to a transformation T (which may either comprise a bijective function or a compression function) resulting in a vector v as follows:

$$v = T(u).$$

In case the resulting vector v is shorter than the output vector u, the transformation T provides a data compression.

Figure 1:
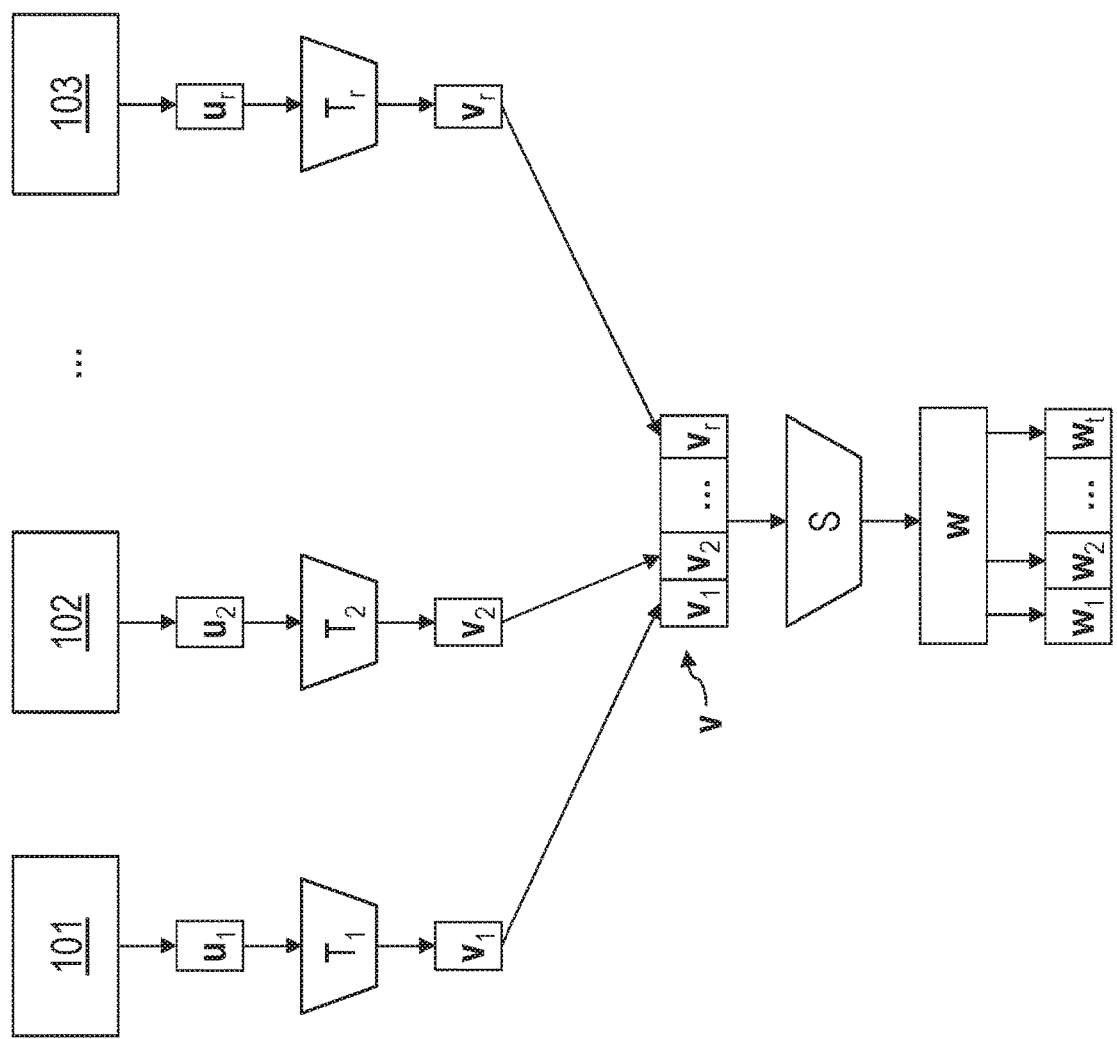
FIG. 1 shows a pseudo-random number generator comprising several non-linear feedback shift registers (NLFSRs)

FIG. 1 shows a pseudo-random number generator comprising r NLFSRs 101, 102, 103.

The NLFSR 101 produces an output vector $u_1$, which is processed by a transformation $T_1$ into a vector $v_1$. The NLFSR 102 produces an output vector $u_2$, which is processed by a transformation $T_2$ into a vector $v_2$. The NLFSR 103 produces an output vector $u_r$, which is processed by a transformation $T_r$ into a vector $v_r$.

Each of the transformations $T_i$ (with $i=1, \ldots, r$) results in a new vector $v_i$. The vectors $v_i$ are concatenated (i.e. combined), which results in a vector v as follows:

$$v = (v_1 | v_2 | \ldots | v_r).$$

This vector v is processed by an additional transformation S (an S-box) to obtain an output vector w. The output vector w may have the same length as the vector v or it may be shorter than the vector v. In the latter scenario, the transformation S conducts a compression of data, i.e. the transformation S comprising a compression function.

In the example shown in FIG. 1, the output vector w may be divided into portions (e.g., bits, bytes, words) $w_i$ with $i=1, \ldots, t$.

Figure 2:
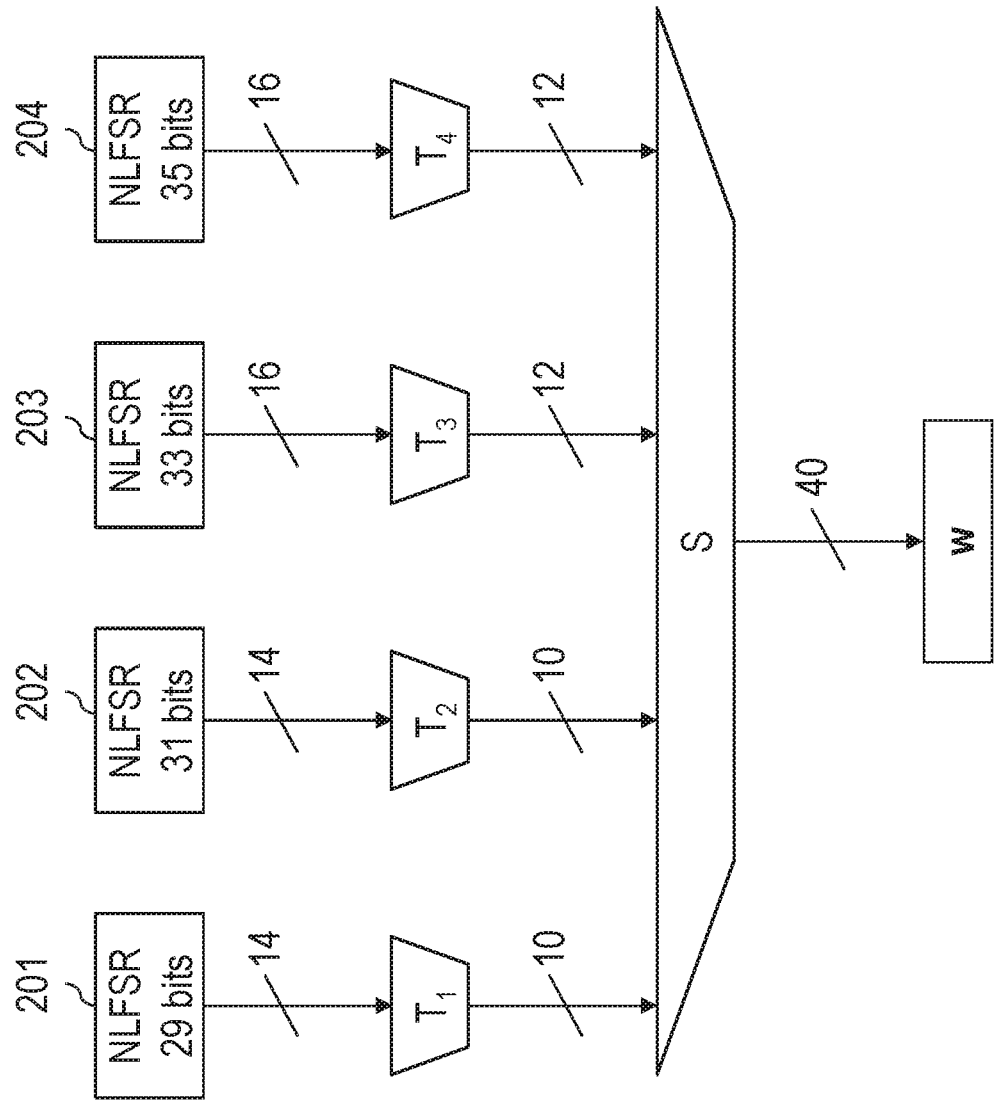
FIG. 2 shows an exemplary use-case scenario comprising four NLFSRs.

FIG. 2 shows an exemplary use-case scenario comprising $r=4$ NLFSRs 201 to 204. The NLFSR 201 has a length of 29 bits, the NLFSR 202 has a length of 31 bits, the NLFSR 203 has a length of 33 bits and the NLFSR 204 has a length of 35 bits. Hence, the NLFSRs 201 to 204 comprise 128 cells (flip-flops); in other words, the internal state of the PRNG shown in FIG. 2 has a size of 128 bits.

The PRNG may be initialized by transferring a random seed to its 128 cells. The random seed may be obtained by a true random generator or any other true or pseudo-random source.

The NLFSR 201 and 202 each output their first 14 cells, resulting in output vectors $u_1$, $u_2$ each of the size of 14 bits. The NLFSR 203 and 204 each output their first 16 cells, resulting in output vectors $u_3$, $u_4$ each of the size of 16 bits. It is noted that the formulation "a vector a of the size of n bits" is equivalent to the phrase "a vector a of length n" or "a vector a of bit length n".

For each of the NLFSRs a transformation $T_i$ is conducted that results in a vector $v_i$ according to $v_i = T_i u_i$ with $i=1, \ldots, 4$. All transformations $T_i$ shown in FIG. 2 comprise compression functions.

In the example shown in FIG. 2, each of the transformations $T_1$, $T_2$ compresses 14-bit input vectors to 10-bit output vectors $v_1$, $v_2$ and each of the transformations $T_3$, $T_4$ compresses 16-bit input vectors to 12-bit output vectors $v_3$, $v_4$. The vector v is formed by concatenating the vectors $v_1$, $v_2$, $v_3$ and $v_4$; hence, the vector v results in a length amounting to 44 bits.

The output of the transformations $T_i$ is fed to a transformation S which results in a 40 bits (5 bytes) output vector w. Hence, in this example, r amounts to 4 and t amounts to 5.

Hence, the random generator shown in FIG. 2 supplies 5 bytes, which may be used by various applications of a chip.

The examples described herein may produce t random words $w_1, w_2, \ldots, w_t$ which are preferably
evenly distributed and
statistically independent.

Hence, a random word w of length k may accommodate any of its $2^k$ possible values, each with the same probability $p = 2^{-k}$.

The various words accommodate their respective values independently from each other. Hence, any knowledge about a value of a single word does not enable any prediction with regard to a value of any other word.

The random words $w_1, w_2, \ldots, w_t$ may be substantially evenly distributed and statistically independent in case the following applies:
(1) Each of the underlying NLFSR has a period amounting to $2^N - j$, wherein N is the length of the shift register and $j \geq 1$ is a small number. In such scenario, the NLFSR has almost the maximum cycle length $2^N$, i.e. the initial state of the NLFSR will repeat itself only after $2^N - j$ clock cycles. In between, there will be $2^N - j$ different states; hence, nearly all $2^N$ possible different states of the shift register will occur (as j may preferably be a small number). Therefore, the vector $u_i$ output by the shift register i is (substantially) evenly distributed. Over a long period of time, each value of the vector $u_i$ may occur almost equally often.
(2) The transformations $T_i$ (with $i=1, \ldots, r$) and S may have a feature that can be referred to as "balanced": For each output vector possible there are an equal number of input vectors, which are mapped to the respective output vector. This implies: if the input vectors are evenly distributed, the output vectors are evenly distributed as well.
The transformation $T_1$ (see FIG. 2) converts the 14 bits input vector $u_1$ into the 10 bits output vector $v_1$. There are $2^{14}$ different input vectors and $2^{10}$ different output vectors. The transformation $T_1$ is balanced if for each output the following holds true: There exist $2^4 = 16$ different input vectors that are mapped to one output vector.

According to an example, the PRNG may comprise shift registers (e.g., NLFSRs) and at least one transformation ($T_i$, S) such that the generated random numbers are in particular at least one of the following: evenly distributed or statistically independent.

In order to allow for a cost-efficient implementation, the transformations may be realized as linear functions. This is acceptable as the underlying shift registers are already non-linear. Using linear functions as transformations $T_i$ and S bears the advantages of good diffusion properties and that they could be realized in hardware in a cost-effective way.

A linear mapping, which transforms a binary n-bit vector into a binary m-bit vector ($m \leq n$) may be realized via a binary $m \times n$ matrix A. This linear mapping is balanced if (and only if) the matrix A has maximum rank, i.e. in this case if rank(A)=m.

It is a design option for the linear functions that the associated matrices have maximum rank.

Figure 3:
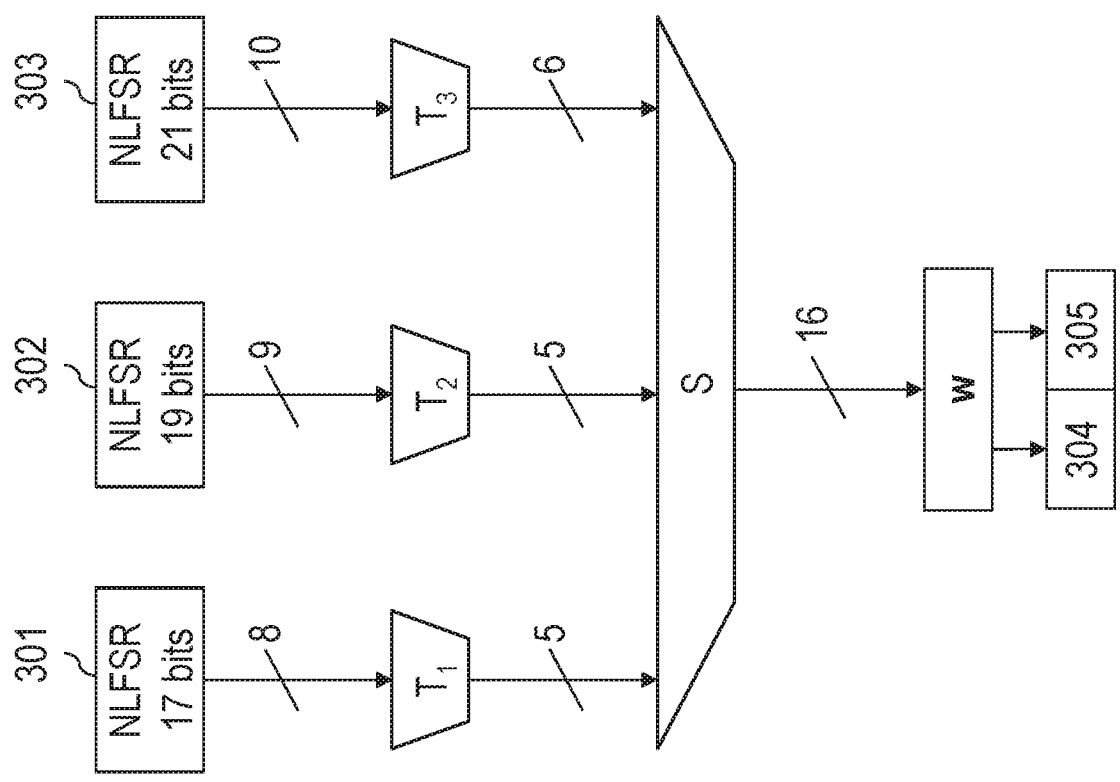
FIG. 3 shows an exemplary random generator comprising three shift registers, each being a NLFSR.

FIG. 3 shows an exemplary random generator comprising three shift registers 301 to 303, each being a NLFSR.

The shift register 301 has a length of 17 bits and produces an output vector $u_1$ of the size 8 bits. The output vector $u_1$ is fed to a (linear) transformation $T_1$, which produces a vector $v_1$ of the size 5 bits.

The shift register 302 has a length of 19 bits and produces an output vector $u_2$ with the size of 9 bits. The output vector $u_2$ is fed to a (linear) transformation $T_2$, which produces a vector $v_2$ of 5 bits size.

The shift register 303 has a length of 21 bits and produces an output vector $u_3$ of the size 10 bits. The output vector $u_3$ is fed to a (linear) transformation $T_3$, which produces a vector $v_3$ of the size 6 bits.

A vector v of length 16 is formed by concatenating the vectors $v_1$, $v_2$ and $v_3$. The vector v is processed by a (linear) transformation S into a 16 bits output vector w. The vector w supplies two bytes 304, 305 for further processing. Hence, the generator of FIG. 3 produces two statistically independent bytes per clock cycle.

At the outset, the three shift registers 301 to 303 may be started in any non-zero state. The shift register 301 has the period $2^{17} - 1$ for all non-zero initial states. Accordingly, the shift register 302 has the period $2^{19} - 1$ for all non-zero initial states and the shift register 303 has the period $2^{21} - 1$ for all non-zero initial states.

The linear transformations are as follows:

$$T_1 = \begin{bmatrix} 1 & 0 & 0 & 0 & 0 & 0 & 0 & 0 \\ 0 & 1 & 0 & 0 & 1 & 0 & 0 & 0 \\ 0 & 0 & 1 & 0 & 0 & 0 & 1 & 1 \\ 0 & 0 & 0 & 1 & 1 & 0 & 0 & 0 \\ 0 & 0 & 0 & 0 & 1 & 0 & 0 & 1 \end{bmatrix}$$

$$T_2 = \begin{bmatrix} 1 & 0 & 0 & 0 & 0 & 0 & 0 & 0 & 0 \\ 0 & 1 & 0 & 0 & 0 & 0 & 0 & 1 & 0 \\ 0 & 0 & 1 & 0 & 0 & 1 & 0 & 0 & 0 \\ 1 & 0 & 0 & 0 & 0 & 0 & 0 & 0 & 1 \\ 0 & 0 & 0 & 1 & 0 & 0 & 1 & 0 & 0 \end{bmatrix}$$

$$T_3 = \begin{bmatrix} 1 & 0 & 0 & 0 & 0 & 0 & 1 & 0 & 0 & 0 \\ 0 & 1 & 0 & 1 & 0 & 0 & 0 & 0 & 1 & 0 \\ 0 & 0 & 1 & 0 & 0 & 1 & 0 & 0 & 0 & 0 \\ 0 & 0 & 0 & 0 & 1 & 0 & 0 & 1 & 0 & 0 \\ 0 & 0 & 0 & 1 & 0 & 0 & 0 & 0 & 0 & 1 \\ 0 & 1 & 0 & 0 & 0 & 1 & 0 & 0 & 0 & 0 \end{bmatrix}$$

The linear transformation S may be defined as $$S = \begin{bmatrix} 1 & 0 & 0 & 0 & 0 & 0 & 1 & 0 & 0 & 0 & 1 & 0 & 0 & 0 & 0 \\ 0 & 1 & 0 & 0 & 0 & 0 & 0 & 1 & 0 & 0 & 0 & 0 & 0 & 0 & 1 \\ 0 & 0 & 1 & 0 & 0 & 1 & 0 & 0 & 0 & 1 & 0 & 0 & 0 & 0 & 0 \\ 0 & 0 & 0 & 1 & 0 & 0 & 0 & 1 & 0 & 0 & 0 & 1 & 0 & 0 & 0 & 0 \\ 0 & 0 & 0 & 0 & 1 & 0 & 0 & 0 & 0 & 1 & 0 & 0 & 0 & 1 & 0 & 0 \\ 0 & 1 & 0 & 0 & 0 & 1 & 0 & 0 & 0 & 0 & 1 & 0 & 0 & 0 & 0 \\ 0 & 0 & 0 & 1 & 0 & 0 & 0 & 0 & 1 & 0 & 0 & 0 & 0 & 1 & 0 & 0 \\ 1 & 0 & 0 & 0 & 0 & 0 & 1 & 0 & 0 & 0 & 1 & 0 & 0 & 0 & 0 & 0 \\ 0 & 0 & 1 & 0 & 0 & 0 & 0 & 1 & 0 & 0 & 0 & 0 & 1 & 0 & 0 & 0 \\ 0 & 0 & 0 & 0 & 1 & 0 & 0 & 0 & 0 & 1 & 0 & 0 & 0 & 0 & 1 & 0 \\ 0 & 0 & 0 & 0 & 1 & 0 & 1 & 0 & 0 & 0 & 1 & 0 & 0 & 0 & 0 & 0 \\ 1 & 0 & 0 & 0 & 0 & 0 & 0 & 0 & 1 & 0 & 0 & 0 & 0 & 1 & 0 & 0 \\ 0 & 0 & 1 & 0 & 0 & 1 & 0 & 0 & 0 & 0 & 0 & 1 & 0 & 0 & 0 & 0 \\ 0 & 0 & 0 & 1 & 0 & 0 & 0 & 1 & 0 & 0 & 0 & 0 & 0 & 0 & 1 & 0 \\ 0 & 1 & 0 & 0 & 0 & 0 & 1 & 0 & 0 & 0 & 0 & 0 & 1 & 0 & 0 & 1 \\ 0 & 0 & 1 & 0 & 0 & 1 & 0 & 0 & 0 & 1 & 0 & 0 & 0 & 0 & 0 & 1 \end{bmatrix}$$

The ranks of the deployed matrices are given by
rank($T_1$)=5
rank($T_2$)=5
rank($T_3$)=6
rank(S)=16.

The examples suggested herein may in particular be based on at least one of the following solutions. In particular combinations of the following features could be utilized in order to reach a desired result. The features of the method could be combined with any feature(s) of the device, apparatus or system or vice versa.

A device for generating a random number is provided, the device comprising:
  at least two shift registers,
  a transformation function that generates the random number based on at least one cell of each of the at least two shift registers.

Each shift register may comprise several cells. The shift register may be a cyclic shift register, in particular a feedback shift register. The shift register may be a non-linear feedback shift register.

The transformation function may utilize only a portion (or all) cells of the shift register as a basis to generate the random number.

Random number in this context may be any true random number or pseudo-random number, which may in particular comprise, e.g., several bits, bytes or words. Advantageously, the solution presented allows generating the random number for each clock cycle.

The at least two shift registers may be initialized via a true or pseudo-random seed, e.g., a random number that may be provided by hard- and/or software.

In an embodiment, the transformation function comprises
  for each shift register a first transformation stage that maps the at least one cell of the respective shift register to at least one intermediate output, wherein the intermediate outputs of the at least two shift registers are combined,
  a second transformation stage that maps the combined intermediate outputs to the random number.

The several intermediate outputs of the at least two shift registers may be concatenated and processed by the second transformation stage. Each of the transformation stage may comprise a mapping rule to provide the same number of bits or a reduced number of bits compared to the number of bits that are input to the transformation stage.

In an embodiment, the first transformation stage conducts a data compression resulting in a reduced number of intermediate output bits compared to its number of input cells.

In an embodiment, the second transformation stage is arranged to conduct a data compression resulting in a reduced number of bits of the random number compared to the number of bits input as intermediate outputs from the first transformation stage.

It is however an option that either the first and/or the second transformation stage does not provide any data compression.

In an embodiment, the first transformation stage or the second transformation stage comprise linear functions.

In an embodiment, the first transformation stage and the second transformation stage comprise linear functions.

In an embodiment, several random numbers generated are substantially evenly distributed and substantially statistically independent.

In an embodiment, the random number is generated with each clock cycle applied to the shift register and the transformation function.

In an embodiment, each of the at least two shift registers has a period amounting to $2^N-j$, wherein N is the length of the shift register and j is a small number.

The small number j may amount to 1, 2 or 3 and is preferably small in comparison to the number $2^N$ of possible states of the shift register.

In an embodiment, the transformation function is arranged such that for each output vector possible there are an equal number of input vectors that are mapped to this respective output vector.

In an embodiment, each shift register is a non-linear feedback shift register.

In an embodiment, the at least two shift registers and the transformation function are implemented on a die or chip.

In an embodiment, the at least two shift registers are at least partially of different length.

In an embodiment, the transformation function generates the random number based on a portion of cells of the at least two shift registers, wherein for at least two shift registers a different number of cells or the same number of cells is used.

Also, a method for generating a random number is suggested, the method comprising:
  generating the random number based on at least one cell of each of at least two shift registers by a transformation function.

In an embodiment, the transformation function comprises
  for each shift register a first transformation stage that maps the at least one cell of the respective shift register to at least one intermediate output, wherein the intermediate outputs of the at least two shift registers are combined,
  a second transformation stage that maps the combined intermediate outputs to the random number.

Further, a device is suggested for generating a random number, the device comprising:
  means for generating the random number based on at least one cell of each of at least two shift registers by a transformation function.

A computer program product is provided, which is directly loadable into a memory of a digital processing device, comprising software code portions for performing the steps of the method as described herein.

In one or more examples, the functions described herein may be implemented at least partially in hardware, such as specific hardware components or a processor. More generally, the techniques may be implemented in hardware, processors, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium, i.e., a computer-readable transmission medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a single hardware unit or provided by a collection of interoperative hardware units, including one or more processors as described above, in conjunction with suitable software and/or firmware.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A device for generating a random number, the device comprising:
   at least three shift registers, wherein each of the shift registers per shift register clock pulse is configured to generate, based on a plurality of cells of the respective shift register, an output vector comprising a plurality of bits; and
   a transformation function configured to generate, based on the output vectors, the random number, wherein the random number comprises a plurality of bits, and the transformation function comprises:
      a first transformation stage comprising first transformations corresponding to the respective shift registers, wherein each of the first transformations has a single input and is configured to map the respective output vector to a further output vector; and
      a second transformation stage configured to map the further output vectors to the random number,
      wherein each of the first transformation stage and the second transformation stage is a linear function.

2. The device according to claim 1, wherein the transformation function comprises:
   a concatenator configured to combine the further output vectors for the second transformation stage to map to the random number,
   wherein the random number is generated in a single clock cycle.

3. The device according to claim 2, wherein the second transformation stage is configured to compress the combined further output vectors to result in a reduced number of bits of the random number.

4. The device according to claim 2, wherein each of the first transformations is configured to map the respective output vector with the respective further output vector.

5. The device according to claim 1, wherein the device is configured to generate a plurality of random numbers that are substantially evenly distributed and substantially statistically independent.

6. The device according to claim 1, wherein the random number is generated with each clock cycle applied to the shift register and the transformation function.

7. The device according to claim 1, wherein each of the shift registers has a period amounting to $2^N-j$, wherein N is the length of the shift register and j is greater than or equal to 1 and less than $2^N$.

8. The device according to claim 1, wherein each of the shift registers is a non-linear feedback shift register.

9. The device according to claim 1, wherein the shift registers and the transformation function are implemented on a die or chip.

10. The device according to claim 1, wherein at least two of the shift registers are of different lengths.

11. The device according to claim 1, wherein the transformation function is configured to generate the random number based on a portion of cells of the shift registers, wherein for at least two of the shift registers a different number of cells is used to generate the respective output vectors.

12. A device for generating a random number, the device comprising:
   at least three shift registers, wherein each of the shift registers per shift register clock pulse is configured to generate, based on a plurality of cells of the respective shift register, an output vector comprising a plurality of bits; and
   a transformation function configured to generate, based on the output vectors, the random number, wherein the random number comprises a plurality of bits, and the transformation function comprises:
      a first transformation stage comprising first transformations corresponding to the respective shift registers, wherein each of the first transformations has a single input and is configured to map the respective output vector to a further output vector, and each of the first transformations is configured to compress the respective output vector to result in a reduced number of bits in the further output vector;
      a second transformation stage configured to map the further output vectors to the random number; and
      a concatenator configured to combine the further output vectors for the second transformation stage to map to the random number,
   wherein the random number is generated in a single clock cycle.

13. A method for generating a random number, the method comprising:
   generating, by respective at least three shift registers per shift register clock pulse based on a plurality of cells of the respective shift registers, an output vector comprising a plurality of bits;
   generating, by a transformation function based on the output vectors, the random number,
   wherein the random number comprises a plurality of bits, and the generating by the transformation function comprises:
      mapping, for each of the shift registers by a respective first transformation having a single input, the respective output vector to a further output vector; and
      mapping, by a second transformation, the further output vectors to the random number,
   wherein each of the first transformation and the second transformation is a linear function.

14. The method according to claim 13, wherein the generating by the transformation function comprises:
   combining, by a concatenator, the further output vectors to be mapped by the second transformation to the random number,
   wherein the random number is generated in a single clock cycle.

15. A non-transitory computer program product directly loadable into a memory of a digital processing device, comprising software code portions for performing the steps of the method according to claim 13.

16. The method according to claim 13, wherein each of the shift registers is a non-linear feedback shift register.

* * * * *